(12) United States Patent
Downey (10) Patent No.: US 8,414,081 B2
(45) Date of Patent: Apr. 9, 2013

(54) VEHICLE SEATING APPARATUS WITH BUCKLE POSITIONING ARRANGEMENT

(75) Inventor: Brian Downey, Westland, MI (US)

(73) Assignee: Nissan North America, Inc., Franklin, TN (US)

( * ) Notice: Subject to any disclaimer, the term of this patent is extended or adjusted under 35 U.S.C. 154(b) by 579 days.

(21) Appl. No.: 12/624,931

(22) Filed: Nov. 24, 2009

(65) Prior Publication Data

US 2011/0121630 A1 May 26, 2011

(51) Int. Cl.
*B60N 2/20* (2006.01)
*B60R 22/00* (2006.01)

(52) U.S. Cl. ........................................ 297/481

(58) Field of Classification Search .................. 297/481
See application file for complete search history.

(56) References Cited

U.S. PATENT DOCUMENTS

| 1,852,599 | A | | 4/1932 | Zaiger et al. |
| 1,917,141 | A | | 7/1933 | Middleton |
| 2,414,520 | A | | 1/1947 | Greenwald |
| 2,681,409 | A | | 6/1954 | Dobbins |
| 3,619,555 | A | | 11/1971 | Bassett, Jr. |
| 5,332,261 | A | * | 7/1994 | Siepierski .................. 280/801.1 |
| 7,040,704 | B2 | * | 5/2006 | Epaud ........................ 297/378.1 |
| 7,229,135 | B2 | * | 6/2007 | Hyatt et al. ................... 297/481 |
| 7,248,790 | B2 | | 7/2007 | Misumi et al. |
| 7,458,609 | B2 | * | 12/2008 | Gyllenspetz et al. ......... 297/481 |
| 7,497,474 | B2 | * | 3/2009 | Sanchez et al. ............ 280/801.1 |
| 7,523,985 | B2 | * | 4/2009 | Bhatia et al. ............. 297/188.04 |
| 7,845,734 | B2 | * | 12/2010 | Gomi et al. .................... 297/481 |
| 8,047,615 | B2 | * | 11/2011 | Marriott et al. ............... 297/481 |
| 2002/0050707 | A1 | | 5/2002 | Nishide |
| 2007/0057501 | A1 | | 3/2007 | Downey |

FOREIGN PATENT DOCUMENTS

JP 2006-193067 A 7/2006
JP 2008-249243 A 10/2008

* cited by examiner

*Primary Examiner* — David Dunn
*Assistant Examiner* — Tania Abraham
(74) *Attorney, Agent, or Firm* — Global IP Counselors, LLP (57) ABSTRACT

A vehicle seating apparatus is provided with a seat assembly and a seat belt buckle assembly. The seat assembly includes a seat bottom and a seat back. The seat back is foldable between a seating configuration and a non-seating configuration in which the seat back is folded onto the seat bottom. The seat belt buckle assembly includes a seat belt buckle bracket and a buckle head. The seat belt buckle bracket has a first end movably coupled to a lateral side of the seat bottom. The buckle head is movably arranged with respect to the seat assembly between a usage position and a stowed position. The buckle head is arranged with respect to the seat assembly such that movement of the seat back from the seating configuration to the non-seating configuration does not contact the buckle head while the buckle head is in the stowed position.

21 Claims, 9 Drawing Sheets

VEHICLE SEATING APPARATUS WITH BUCKLE POSITIONING ARRANGEMENT

BACKGROUND

1. Field of the Invention

The present invention generally relates to a vehicle seating apparatus. More specifically, the present invention relates to a vehicle seating apparatus having a fold down seat back that is provided with a seat belt buckle positioning arrangement.

2. Background Information

In some vehicles, there are various seating arrangements that allow rear seated occupants to easily get in and out of the rear seat area of the vehicle compartment. Some vehicle seats are accordingly provided with a reclining mechanism which allows the seat back to incline forwards in order to provide a wider entrance or exit space for the rear seat occupants. In other seating arrangements, a so-called "walk-in" system for moving the front seat in a frontward direction along a seat slide mechanism is provided for the front seat. It is also known to provide seats that can fold to provide room for cargo in vehicles, including trucks. For example, in some vehicles, the seat includes a seat back and a seat bottom in which the seat back can down into a stowed position to provide a relatively flat storage surface. Thus, cargo can be placed on the surface of the folded down seat back.

SUMMARY

In view of the state of the known technology, one aspect of this illustrated embodiment is to provide a vehicle seating apparatus that basically comprises a seat assembly and a seat belt buckle assembly. The seat assembly includes a seat bottom and a seat back. The seat back is movably arranged with respect to the seat assembly between a seating configuration and a non-seating configuration in which the seat back is folded onto the seat bottom. The seat belt buckle assembly includes a seat belt buckle bracket and a buckle head. The seat belt buckle bracket has a first end movably coupled to a lateral side of the seat bottom. The buckle head is coupled to a second end of the buckle bracket that is distal with respect to the first end of the buckle bracket. The buckle head is movably arranged with respect to the seat assembly between a usage position and a stowed position. The buckle head is arranged with respect to the seat assembly such that movement of the seat back from the seating configuration to the non-seating configuration does not contact the buckle head while the buckle head is in the stowed position.

BRIEF DESCRIPTION OF THE DRAWINGS

Referring now to the attached drawings which form a part of this original disclosure.

DETAILED DESCRIPTION OF EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
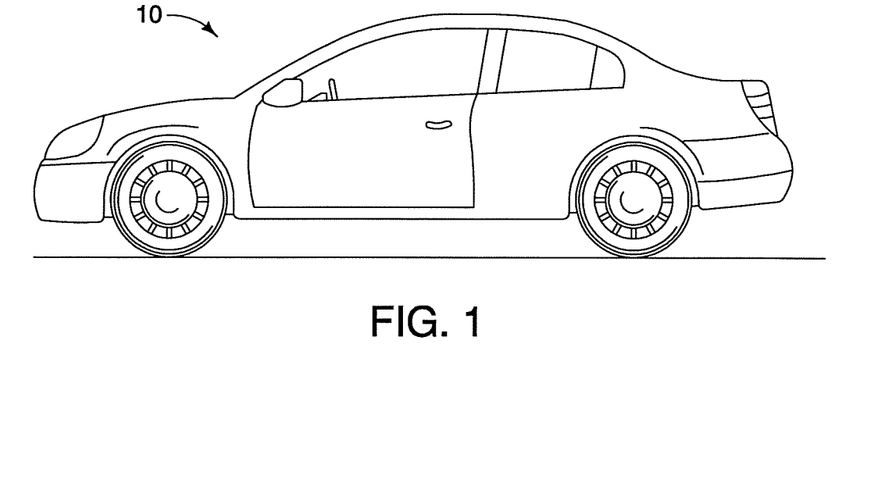
FIG. 1 is a side elevational view of a two door vehicle is illustrated that is equipped with a vehicle seating apparatus in accordance with one embodiment.
Figure 2:
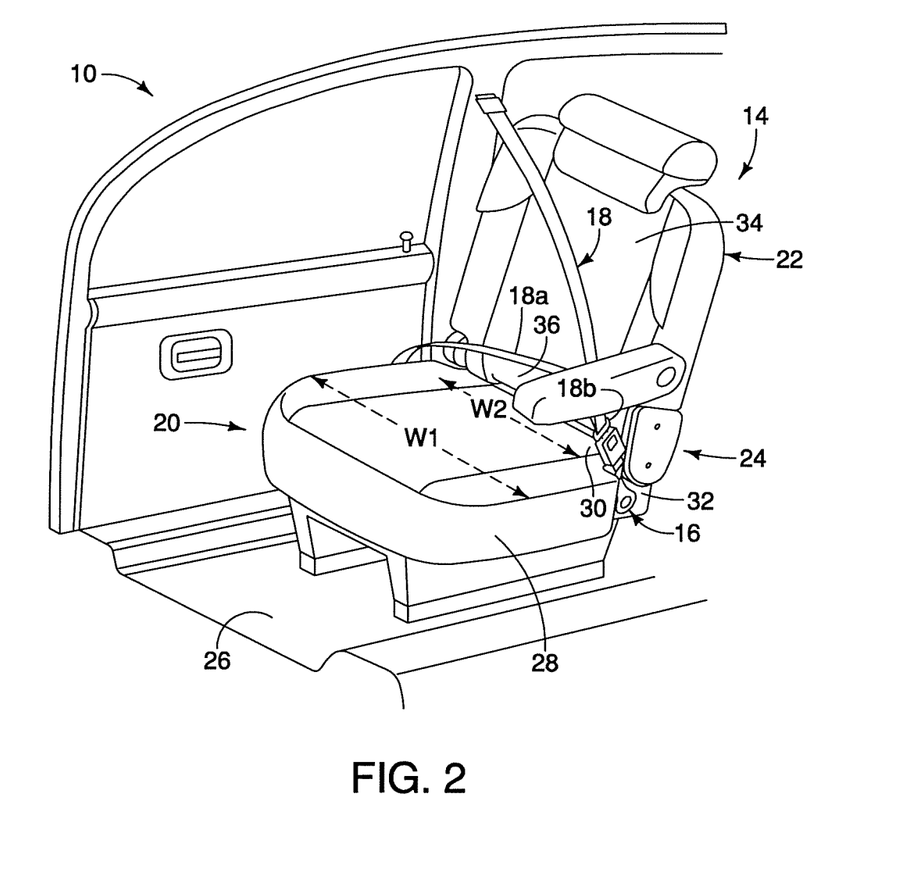
FIG. 2 is a front side perspective view of a front passenger side seat of the vehicle illustrated in FIG. 1, with the seat back in a seating configuration and the seat belt buckle assembly in a usage position.
Figure 3:
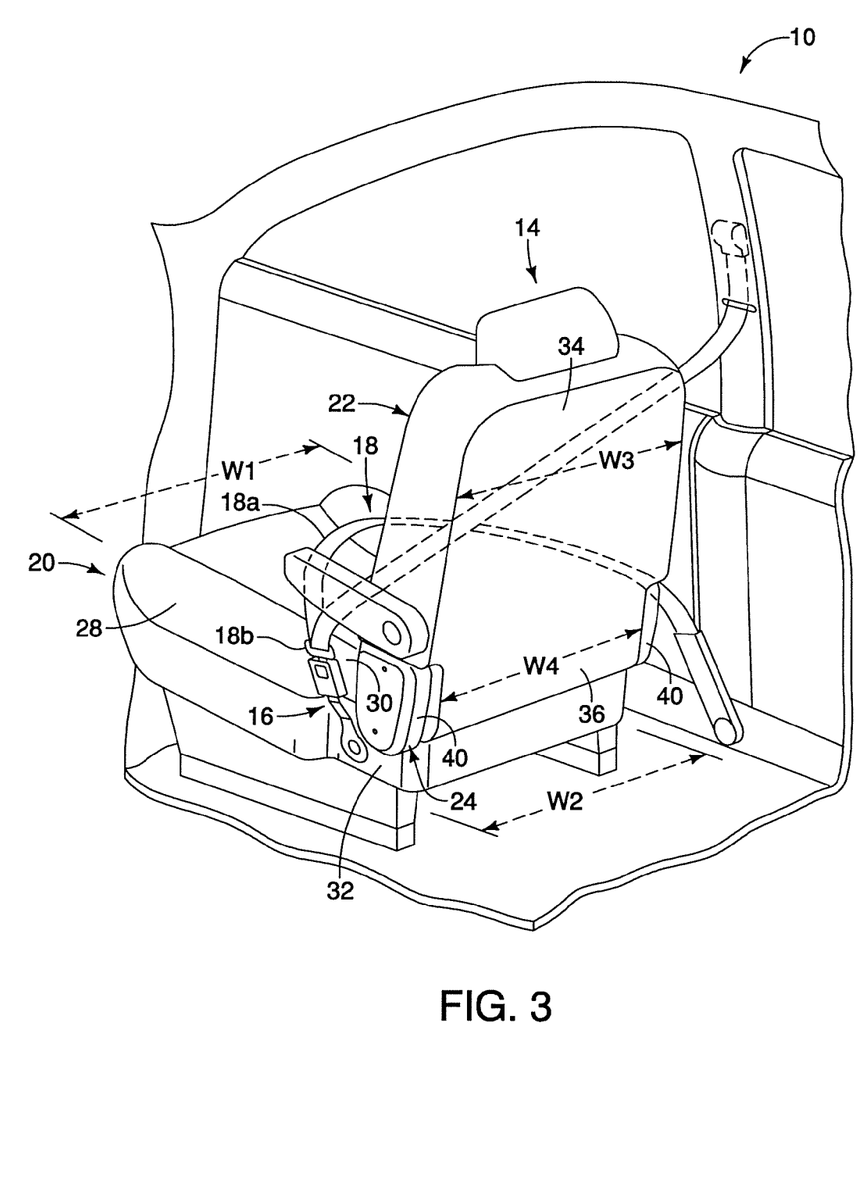
FIG. 3 is a rear side perspective view of the front passenger side seat illustrated in FIG. 2, with the seat back in the seating configuration and the seat belt buckle assembly in the usage position.

Referring initially to FIGS. 1 to 3, a vehicle 10 is illustrated equipped with a vehicle seating apparatus 12 in accordance with one illustrated embodiment. The vehicle seating apparatus 12 includes a seat assembly 14 and a seat belt buckle assembly 16 that cooperates with a seat belt assembly 18 in a conventional manner. The vehicle 10 is depicted as a two door coupe in FIG. 1, with the seat assembly 14 being depicted as a front passenger side seat in FIG. 2. However, the vehicle seating apparatus 12 can be used in other types of vehicles as needed and/or desired. For example, the vehicle seating apparatus 12 can also be used in sports utility vehicles and/or vans, with the seat assembly 14 being applied to either a front seat or a rear seat, or both. Since passenger compartments of vehicles differ from vehicle to vehicle, the passenger compartment will only be described in order to understand one basic installation of the vehicle seating apparatus 12.

Referring to FIGS. 2 and 3, the seat assembly 14 includes a seat bottom 20, a seat back 22 and a hinge 24 that pivotally connects the seat back 22 to the seat bottom 20. The seat bottom 20, the seat back 22 and the hinge 24 can take a variety of configurations depending on the configuration of the vehicle. Thus, by way of example, the seat bottom 20, the seat back 22 and the hinge 24 will be briefly discussed with respect to the illustrated embodiment.

Generally speaking, the seat bottom 20 is fixed to a vehicle floor 26 in a conventional manner. The precise connection between the seat bottom 20 and the vehicle floor 26 can any type of connection. For example, the seat bottom 20 can be non-movably fixed to the vehicle floor 26, or can be fixed to the vehicle floor 26 by a fore and aft adjustment mechanism to move the seat assembly 14 back and forth between a plurality of seat fixing positions. The seat bottom 20 is generally formed of a conventional seating construction with a resilient cushion with a seat cover at least partially overlying a rigid framing structure. The resilient cushion of the seat bottom 20 includes a forward section 28 and a rearward section 30 with each of the lateral sides of the rearward section 30 having a recessed section 32. At the recessed sections 32, little or no cushion exits. The forward section 28 has a lateral width W1 that is larger than a lateral width W2 between the recessed sections 32. In other words, the forward section 28 is disposed forward of the recessed sections 32 of the seat bottom 20 and protrudes laterally beyond the recessed sections 32 of the seat bottom 20. Thus, the forward section 28 forms an outer perimeter of each of the lateral sides of the seat bottom 20. This allows the seat belt buckle assembly 16 to be mounted within the recessed section 32 of the inbound lateral side of the seat bottom 20, which is in turn recessed with respect to the outer perimeter of the inbound lateral side of the seat bottom 20, so that the seat belt buckle assembly 16 tucked out of the way.

For the sake of simplicity of this disclosure, the recessed sections 32 on the inbound and outbound lateral sides are mirror images of each other, but for the attachment of the seat belt buckle assembly 16 in the recessed section 32 of the inbound lateral side. However, the recessed sections 32 on the inbound and outbound lateral sides can be different as needed and/or desired. In any event, in the illustrated embodiment, the seat bottom 20 narrows in the area of the recessed sections 32 with respect to the forward section 28.

Figure 4:
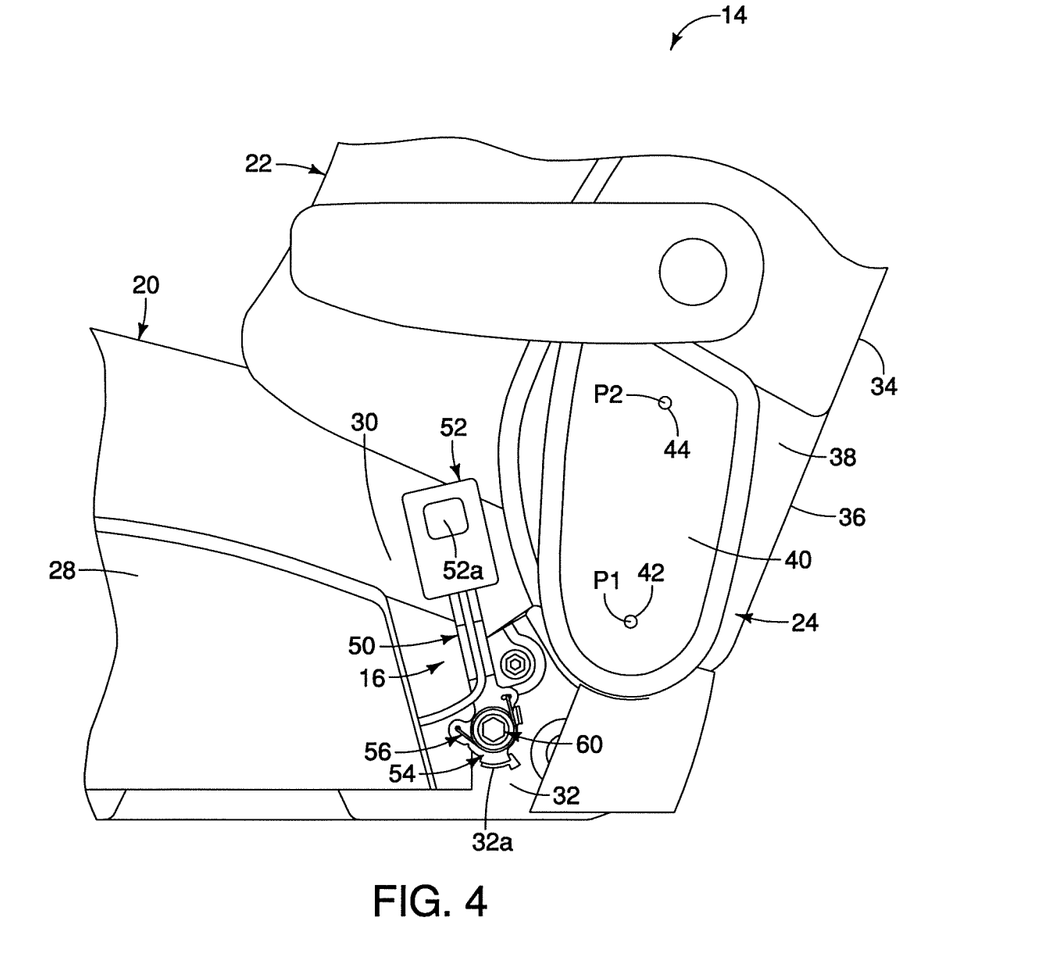
FIG. 4 is a partial side elevational view of the front passenger side seat illustrated in FIGS. 2 and 3, with the seat back in the seating configuration and the seat belt buckle assembly in a stowed position.
Figure 8:
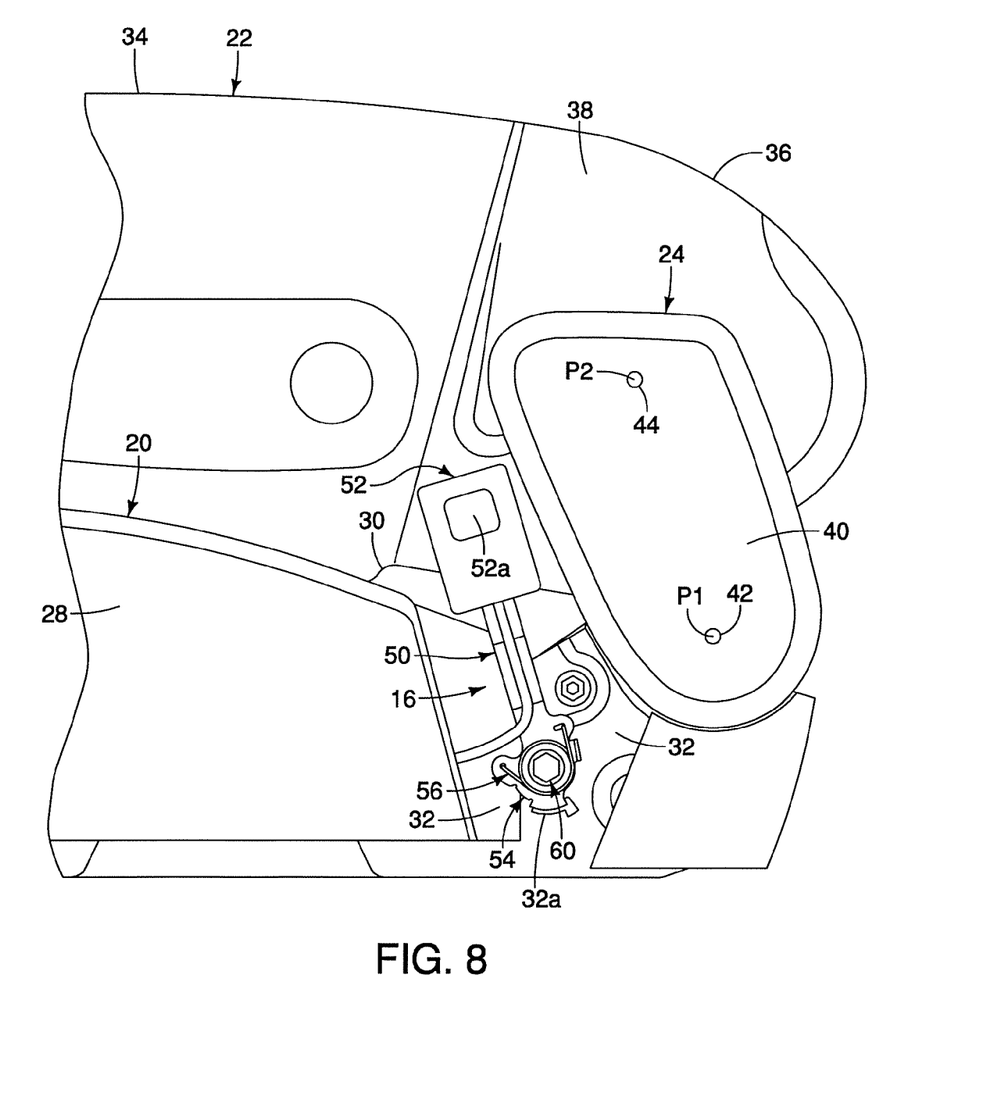
FIG. 8 is an enlarged, partial side elevational view of the front passenger side seat illustrated in FIG. 6, but with the seat back in the non-seating configuration and the seat belt buckle assembly in the stowed position.

As seen best seen in FIGS. 4 and 8, the seat back 22 is movably arranged with respect to the seat bottom 20 of the seat assembly 14 by the hinge 24 between a seating configuration (FIG. 4) and a non-seating configuration (FIG. 8) in which the seat back 22 is folded onto the seat bottom 20. The hinge 24 constitutes a mounting structure that pivotally supports the seat back 22 on the seat bottom 20. Optionally, the seat assembly 14 can include other features such as a reclining mechanism for holding the seat back 22 at a plurality of seating configurations as needed and/or desired. The seat back 22 is generally formed of a conventional seating construction with a resilient cushion with a seat cover at least partially overlying a rigid framing structure. The resilient cushion of the seat back 22 includes an upper section 34 and a lower section 36 with each of the lateral sides of the lower section 36 having a recessed section 38. At the recessed sections 38, little or no cushion exits. The upper section 34 has a lateral width W3 that is larger than a lateral width W4 between the recessed sections 38 of the lower section 36. In other words, the upper section 34 is disposed above the recessed sections 38 of the seat back 22 and protrudes laterally beyond the recessed sections 38 of the seat back 22 to overhang above the recessed section of the seat bottom 20. Thus, the upper section 34 forms an outer perimeter of each of the lateral sides of the seat back 22. This allows the hinges 24 to be mounted within the recessed sections 38 of the lateral sides of the seat back 22, which in turn are recessed with respect to the outer perimeter of the lateral sides of the seat back 22, so that the hinges 24 do not protrude outwardly beyond the outer perimeter of each of the lateral sides of the seat back 22.

For the sake of simplicity of this disclosure, the recessed sections 38 on the inbound and outbound lateral sides are mirror images of each other. However, the recessed sections 32 on the inbound and outbound lateral sides can be different as needed and/or desired. In any event, in the illustrated embodiment, the seat back 22 narrows in the area of the recessed sections 38 with respect to the upper section 34 so that the recessed sections 38 can receive the hinge 24, which constitutes the mounting structure for pivotally attaching the seat back 22 to the seat bottom 20.

As seen best seen in FIGS. 4 and 8, the hinge 24 connects the lateral sides of the seat bottom 20 to the lateral sides of the seat back 22. In the illustrated embodiment, both the seat back 22 and the seat bottom 20 of the seat assembly 14 are connected by the hinge 24 that has two pivot points. In particular, in this illustrated embodiment, the hinge 24 includes a pair of coupling plates 40, with each of the coupling plates 40 having a first pivot pin 42 and a second pivot pin 44. The coupling plates 40 are hard rigid members. Each of the first pivot pins 42 forms a first pivotal connection that pivotally couples the seat back 22 to the corresponding one of the coupling plates 40 about a first pivot axis P1. Each of the second pivot pins 44 forms a second pivotal connection that pivotally couples the seat bottom 20 to the corresponding one of the coupling plates 40 about a second pivot axis P2 that is offset from the first pivot axis P1. Thus, the first pivot axis P1 constitutes a first pivot point, while the second pivot axis P2 constitutes a second pivot point.

The first pivot axis P1 is located below the second pivot axis P2. The first pivot axis P1 allows for rotation of the seat back 22 as a whole, similar to a conventional vehicle seat. The second pivot axis P2 is located above the first pivot axis P1 and allows the seat back 22 to be rotated forward such that a majority of the seat back 22 seating surface and the seat bottom 20 seating surface are aligned/facing each other to form a substantially flat space (the back portion of the seat back 22) that can be used for storing objects or support a load. The first pivotal connections of the hinge 24 are disposed in the recessed sections 38 of the seat back 22. The second pivotal connections of the hinge 24 are disposed in the recessed sections 32 of the seat bottom 20. The first and second pivotal connections of the hinge 24 are arranged such that the second pivotal connection of the hinge 24 moves first causing the seat back 22 to come forward, and then the first pivotal connection of the hinge 24 moves causing the seat back 22 to tilt downward to the non-seating configuration during a folding operation of the seat back 22 from the seating configuration to the non-seating configuration.

The coupling plates 40 are positioned along the recessed sections 38 formed in the lower portion of the lateral sides of the seat back 22 and the recessed sections 32 formed in the rear portion of the lateral sides of the seat bottom 20. The seat belt buckle assembly 16 is located in an area of the recessed section 32 on the inbound lateral side of the seat bottom 20, just forward of the first pivot axis P1 of one of the coupling plates 40 of the hinge 24. The seat belt buckle assembly 16 is positioned inwardly of an outermost side the edge of the seat bottom 20 and the seat back 22. Thus, there is potential for the seat belt buckle assembly 16 to contact a portion of the seat back 22, leaving marks/damage. However, the seat belt buckle assembly 16 is configured and arranged to avoid this potential problem.

Figure 9:
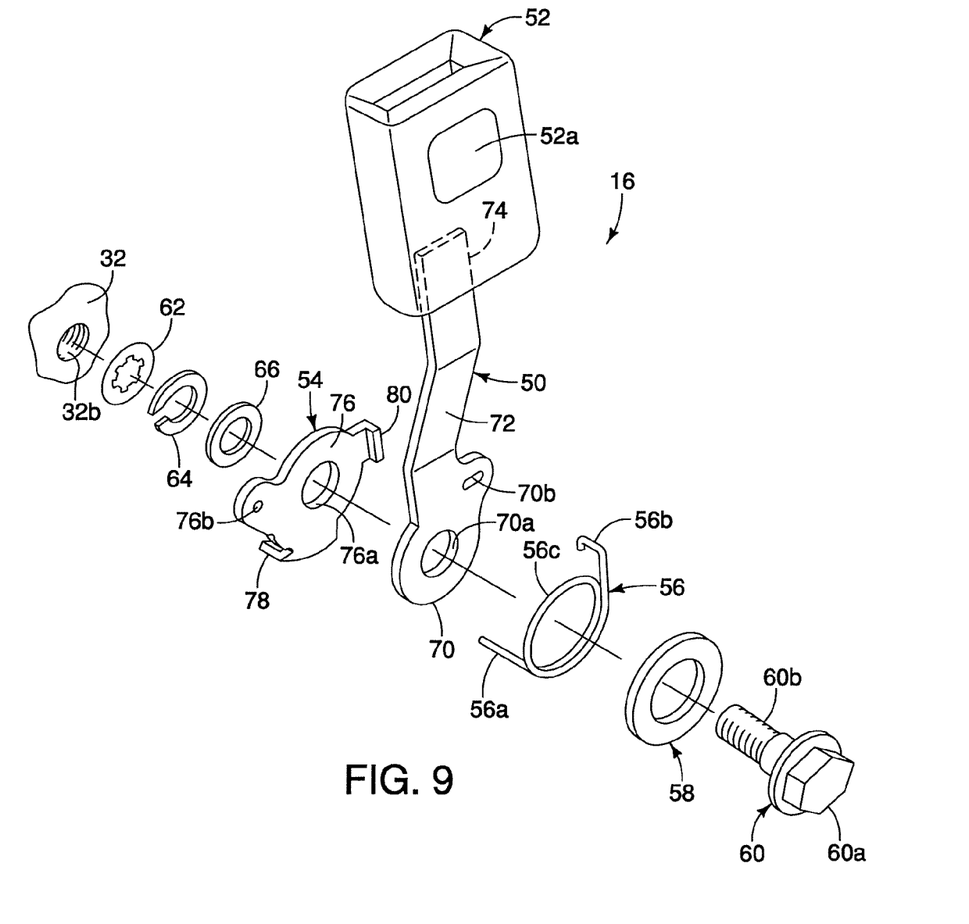
FIG. 9 is an exploded perspective view of the main parts of the seat belt buckle assembly illustrated in FIGS. 2 to 8.

Now the seat belt buckle assembly 16 will be discussed in more detail with respect to FIGS. 5 to 9. As seen in FIG. 9, the seat belt buckle assembly 16 includes a seat belt buckle bracket 50, a buckle head 52, an anchor plate 54, a spring 56, a spring washer 58, a fastener 60, a lock ring 62, a split washer 64 and a spacer 66. The seat belt assembly 18 has a seat belt 18a with a seat belt tongue member 18b slidably arranged on the seat belt 18a in a conventional manner. The seat belt tongue member 18b engages the buckle head 52 in a releasable manner, which is well known in the automotive field. Thus, the seat belt assembly 18 will not be discussed in detail herein.

The seat belt buckle assembly 16 is configured and arranged to prevent the buckle head 52 from contacting the seat back 22 when the seat back 22 is moved into a non-seating configuration (e.g., the seat back 22 folded forward onto the seat bottom 20). Preventing contact of the buckle head 52 and the seat back 22 reduces wear marks or other damage to the seat back 22, and thus improves customer satisfaction and durability of the seat. The seat belt buckle assembly 16 is attached to the inbound lateral side of the seat bottom 20 in the recessed sections 32 formed in the rear portion of the lateral sides of the seat bottom 20.

Basically, the seat belt buckle bracket 50 is pivotally mounted with respect to the seat bottom 20 about the center longitudinal axis of the fastener 60 for movement between a stowed position (FIGS. 4, 5 and 8) for non-seating/cargo and a usage position (FIGS. 6 and 7) for seating. The spring 56 cooperates with the seat belt buckle bracket 50 and the anchor plate 54 to bias the seat belt buckle bracket 50 and the buckle head 52 to the stowed position (FIGS. 4, 5 and 8), which is a substantially upright condition. In other words, in this embodiment, the seat belt buckle bracket 50 is biased in a rearward direction with respect to the seat bottom 20 toward the seat back 22 by the spring 56. Preferably, the buckle head 52 is arranged with respect to the seat assembly 14 such that movement of the seat back 22 from the seating configuration to the non-seating configuration does not contact the buckle head 52 while the buckle head 52 is in the stowed position as seen in FIG. 8. The seat belt buckle bracket 50 is configured and arranged as a manually operated element that is moved from the stowed configuration to the usage configuration by an occupant while the seat back 22 in the seating configuration. As mentioned above, the seat belt buckle assembly 16 biases the buckle head 52 to the stowed configuration (upright), such that movement of the seat back 22 to the non-seating/cargo configuration does not cause contact with the buckle head 52. If the seat is occupied, then the occupant can easily locate the buckle head 52 (as it is in the upright position), but can also be rotated forward to a desired usage position. Since there is no stopper on the seat belt buckle assembly 16 to prevent the buckle head 52 from being stopped in the forward direction, and since the seat cushion of the seat bottom 20 is resilient/flexible near the buckle head 52, the buckle head 52 may be moved forward to the desired usage position as seen in FIG. 6.

The seat belt buckle bracket 50 is a hard, rigid member that is made from a suitable material such as a metal plate material. In this illustrated embodiment, the seat belt buckle bracket 50 is a one-piece, unitary member that has a first end 70, a middle connection section 72 and a second end 74. The first end 70 of the seat belt buckle bracket 50 constitutes a mounting end of the seat belt buckle bracket 50, while the second end 74 of the seat belt buckle bracket 50 constitutes a free end of the seat belt buckle bracket 50. The buckle head 52 is distal with respect to the first end 70 of the seat belt buckle bracket 50. The middle connection section 72 has a bend that offsets the second end 74 farther from the seat bottom 20 than the first end 70.

The first end 70 of the seat belt buckle bracket 50 is movably coupled to a lateral side of the seat bottom 20 at the inbound recessed section 32 by the fastener 60. In particular, in this illustrated embodiment, the first end 70 has a mounting hole 70a for receiving the fastener 60 and a spring engagement aperture 70b for engaging the spring 56. The buckle head 52 is coupled to the second end 74 of the seat belt buckle bracket 50 so as to be cantilevered with respect to the first end 70 of the seat belt buckle bracket 50. As mentioned above, the buckle head 52 is movably arranged with respect to the seat assembly 14 between the stowed position (FIGS. 4, 5 and 8) and the usage position (FIGS. 6 and 7) with the spring 56 applying an urging force on the seat belt buckle bracket 50 to normally hold the buckle head 52 in the stowed position (FIGS. 4, 5 and 8).

Basically, the buckle head 52 is a conventional seat belt buckle member that engages the seat belt tongue member 18b in a releasable manner, which is well known in the automotive field. In this illustrated embodiment, the buckle head 52 is molded around a portion of the second end 74 of the seat belt buckle bracket 50 so that the second end 74 of the seat belt buckle bracket 50 is partially embed in the buckle head 52. The buckle head 52 includes a push button 52a for selectively releasing the seat belt tongue member 18b. The buckle head 52 is disposed in the recessed section 32 of the seat back 22 with the seat back 22 being in the stowed position and the seat assembly 14 being in the non-seating configuration as seen in FIG. 8. As seen in FIG. 8, the buckle head 52 is free from contact with the seat back 22 during a folding operation of the seat back 22 from the seating configuration to the non-seating configuration.

Figure 5:
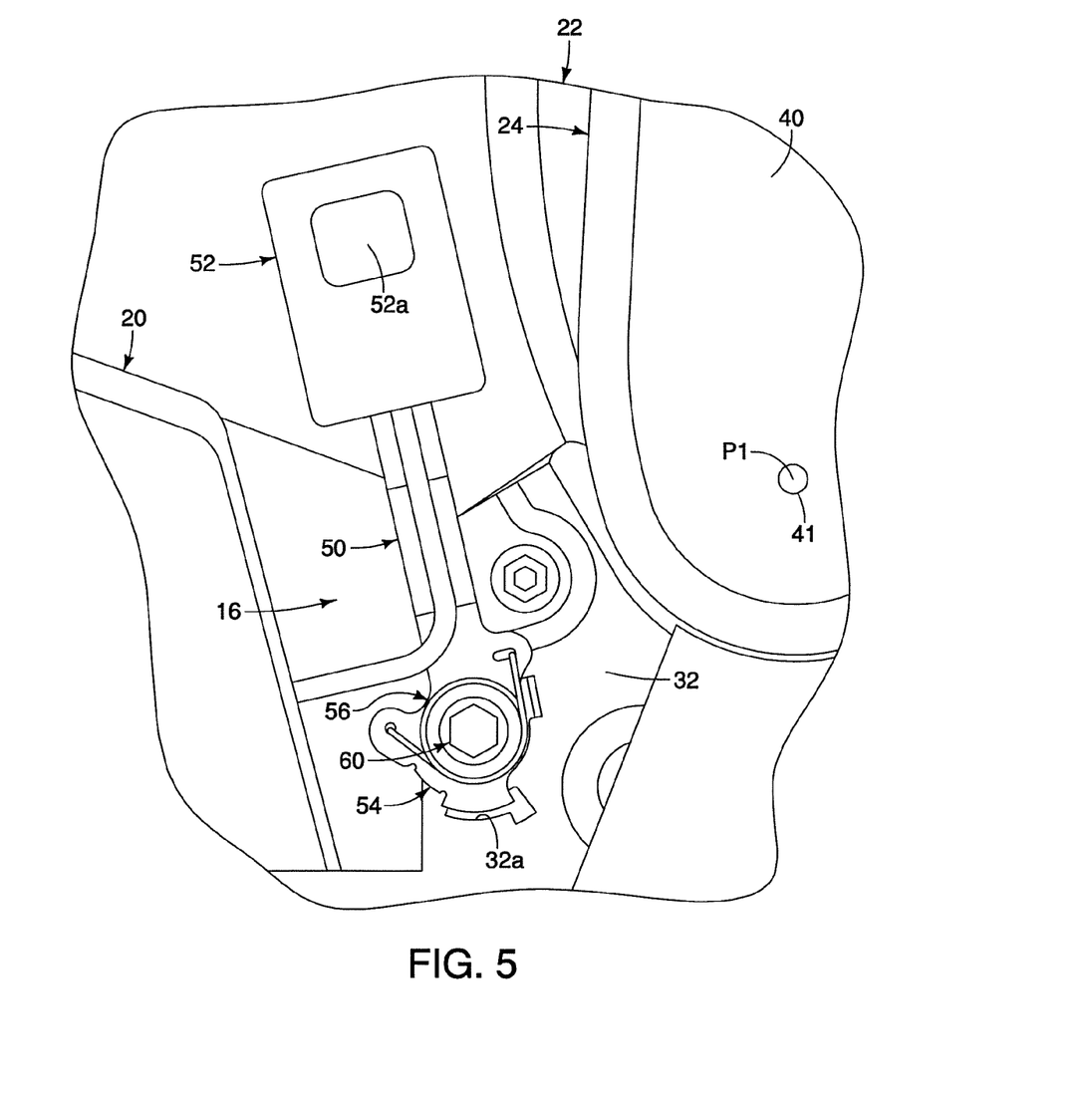
FIG. 5 is an enlarged, partial side elevational view of the front passenger side seat illustrated in FIG. 4, with the seat back in the seating configuration and the seat belt buckle assembly in the stowed position.
Figure 6:
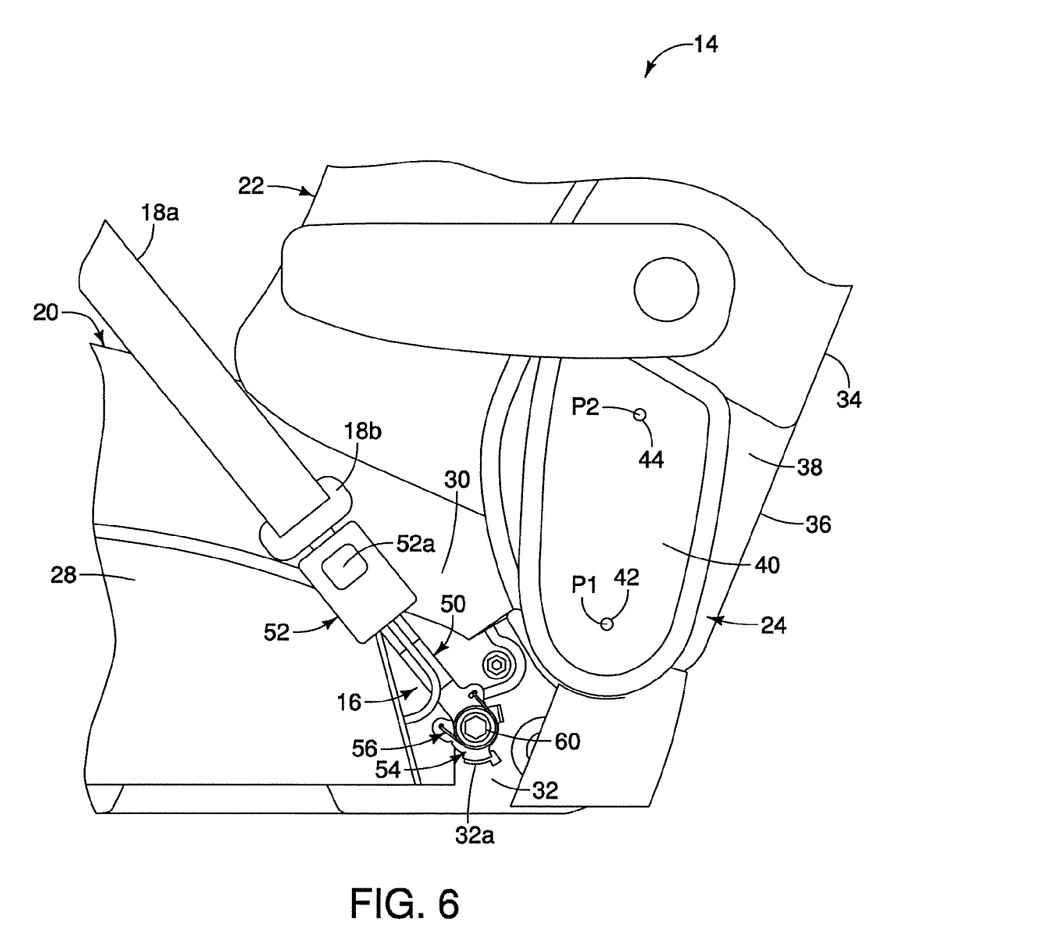
FIG. 6 is a partial side elevational view of the front passenger side seat illustrated in FIGS. 2 to 5, with the seat back in the seating configuration and the seat belt buckle assembly in the usage position.
Figure 7:
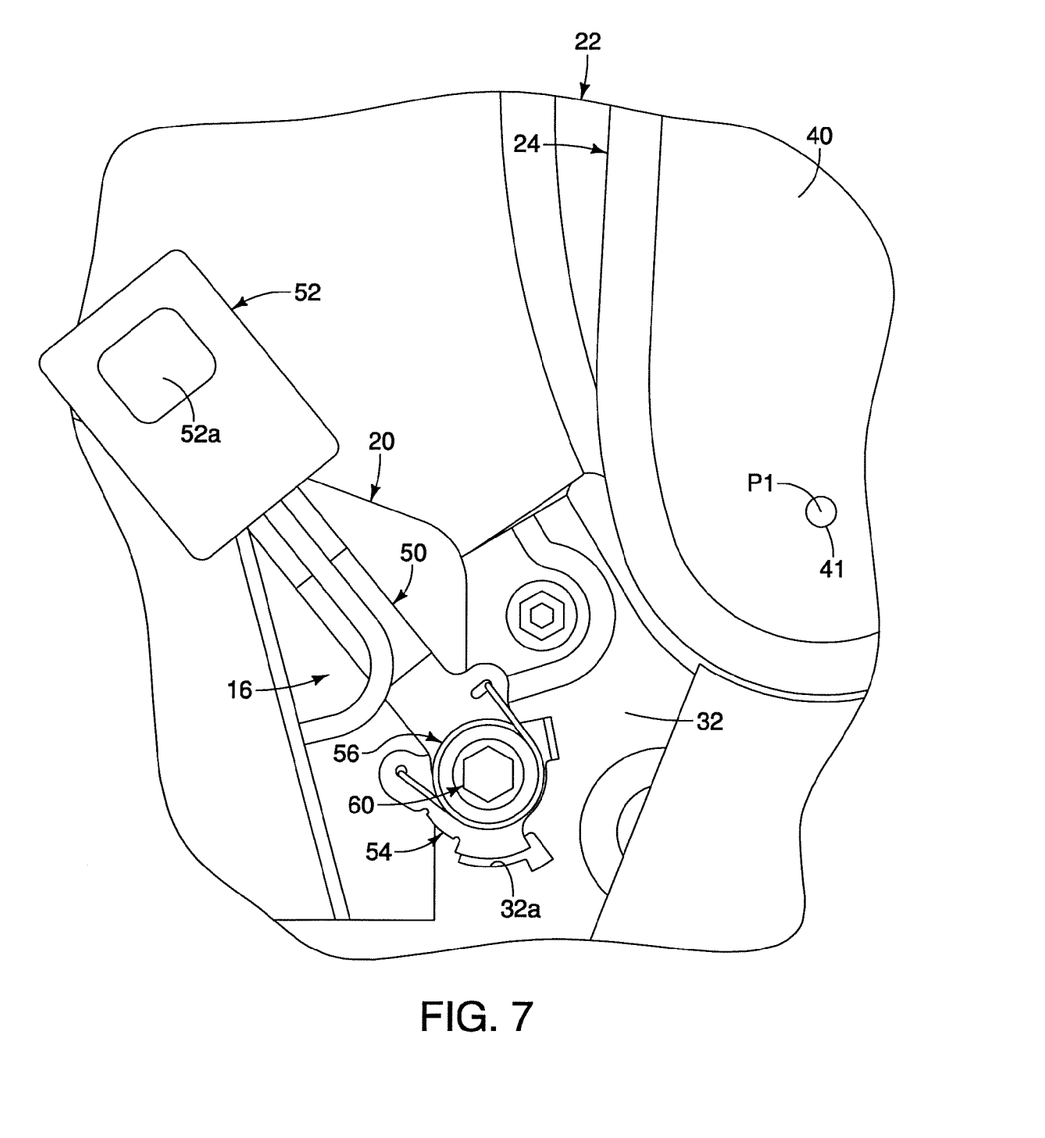
FIG. 7 is an enlarged, partial side elevational view of the front passenger side seat illustrated in FIG. 6, with the seat back in the seating configuration and the seat belt buckle assembly in the usage position.

As best seen in FIGS. 5, 7 and 9, the anchor plate 54 is attached to the inbound lateral side of the seat bottom 20 at the recessed section 32 by the fastener 60. The anchor plate 54 restricts movement of the seat belt buckle bracket 50 in a direction rearward of the stowed position. In particular, in this embodiment, the anchor plate 54 is a one-piece, unitary member that includes a main body portion 76, a locating member or flange 78 and a stop member or flange 80. The anchor plate 54 is a hard, rigid member that is made from a suitable material such as a metal plate material. The main body portion 76 has a fastener receiving opening 76a that receives the fastener 60. The main body portion 76 also has a spring engagement aperture 76b for engaging the spring 56. The spring engagement aperture 76b is spaced apart from the fastener 60 to engage a the spring 56 that biases the seat belt buckle bracket 50 in the rearward direction with respect to the seat bottom 20 toward the seat back 22. The locating flange 78 protrudes from the main body portion 76 to restrict movement of the anchor plate 54 with respect to the seat bottom 20 after installation of the seat belt buckle assembly 16 on the seat bottom 20. In this embodiment, the locating flange 78 is disposed in a locating aperture 32a of the rigid framing structure of the seat bottom 20. The locating flange 78 engages the rigid framing structure of the seat bottom 20 so that the locating flange 78 does not rotate with respect to the seat bottom 20 after installation of the seat belt buckle assembly 16 on the seat bottom 20. The stop flange 80 protrudes from the main body portion 76 to restrict movement of the seat belt buckle bracket 50 in the direction rearward of the stowed position after installation of the seat belt buckle assembly 16 on the seat bottom 20.

Figure 10:
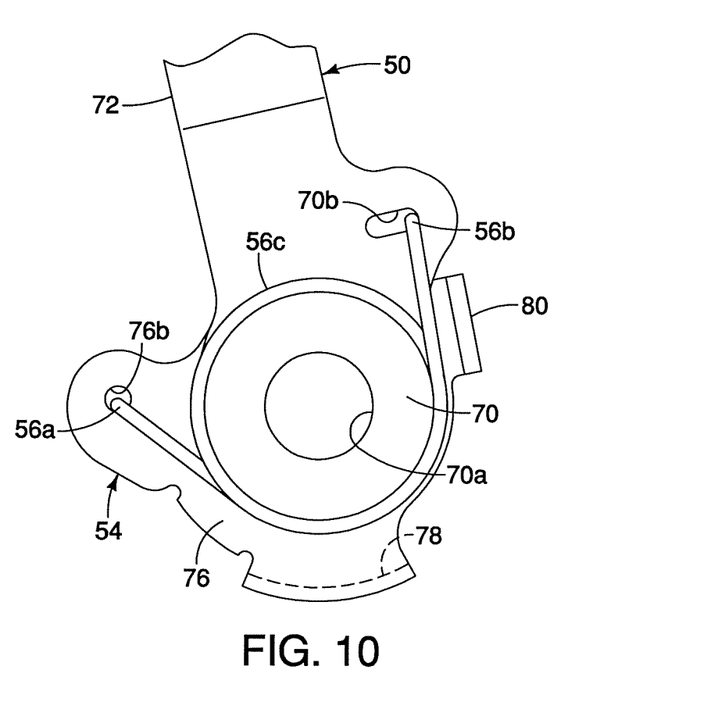
FIG. 10 is an enlarged partial side elevational view of the attachment end of the seat belt buckle positioning assembly in the stowed position.
Figure 11:
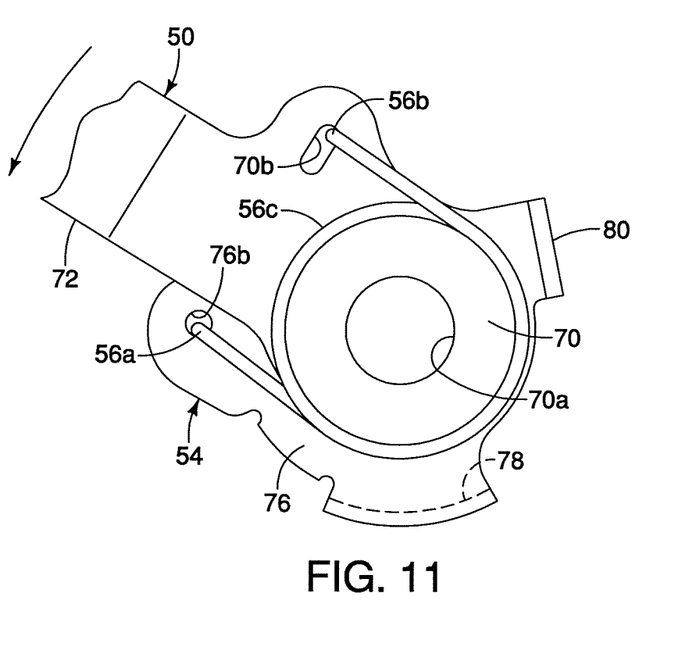
FIG. 11 is an enlarged partial side elevational view of the attachment end of the seat belt buckle positioning assembly in the usage position.

As best seen in FIGS. 9 to 11, the spring 56 has a first end 56a, a second end 56b and a coiled portion 56c that extends between the first and second ends 56a and 56b. The first end 56a of the spring 56 engages the anchor plate 54. The second end 56b of the spring 56 engages the seat belt buckle bracket 50. In particular, in this embodiment, the first end 56a of the spring 56 is disposed in the spring engagement aperture 76b of the anchor plate 54, while the second end 56b of the spring 56 is disposed in the spring engagement aperture 70b of the seat belt buckle bracket 50. The coiled portion 56c of the spring 56 is disposed around the fastener 60 in this embodiment. The spring 56 applies a biasing force to bias the seat belt buckle bracket 50 in the rearward direction with respect to the seat bottom 20 toward the seat back 22 to the stowed configuration as mentioned above.

In this illustrated embodiment, the fastener 60 is a bolt releasably secures the other parts of the seat belt buckle assembly 16 to the seat bottom 20. Generally speaking, the fastener 60 couples the seat belt buckle bracket 50 and the anchor plate 54 to the inbound lateral side of the seat bottom 20. The fastener 60 has a head portion 60a and a shaft portion 60b. The spring washer 58 is a metal washer that is disposed on the shaft portion 60b of the fastener 60 between the head portion 60a of the fastener 60 and the spring 56. The lock ring 62, the split washer 64 and the spacer 66 are all disposed on the shaft portion 60b of the fastener 60 between the anchor plate 54 and the rigid framing structure of the seat bottom 20 that includes a threaded hole 32b of the recessed section 32 on the inbound lateral side of the seat bottom 20.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of a vehicle equipped with the vehicle seating apparatus. Accordingly, these terms, as utilized to describe the present invention should be interpreted relative to a vehicle equipped with the vehicle seating apparatus. The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A vehicle seating apparatus comprising
    a seat assembly including
        a seat bottom, and
        a seat back movably arranged with respect to the seat assembly between a seating configuration and a non-seating configuration in which the seat back is folded onto the seat bottom; and
    a seat belt buckle assembly including
        a seat belt buckle bracket having a first end movably coupled to a lateral side of the seat bottom, and
        a buckle head coupled to a second end of the buckle bracket that is distal with respect to the first end of the buckle bracket, with the buckle head being movably arranged with respect to the seat assembly between a usage position and a stowed position, the buckle head being arranged with respect to the seat assembly such that the seat back does not contact the buckle head and the buckle head remains stationary in the stowed position relative to the seat bottom as the seat back moves from the seating configuration to the non-seating configuration,
    the lateral side of the seat bottom has a recessed section, which is recessed with respect to an outer perimeter of the lateral side of the seat bottom, and which is disposed adjacent the seat back, with the seat belt buckle assembly being mounted within the recessed section of the seat bottom, the seat back includes an upper section that protrudes laterally beyond the recessed section of the seat bottom to overhang above the recessed section of the seat bottom, and
    the seat assembly further includes a hinge connecting the lateral side of the seat bottom to a lateral side of the seat back, with the hinge having a first pivotal connection pivotally coupling the seat back about a first pivot axis and a second pivotal connection pivotally coupling the seat bottom about a second pivot axis that is offset from the first pivot axis.

2. The vehicle seating apparatus according to claim 1, wherein
    the lateral side of the seat back has a recessed section, which is recessed with respect to an outer perimeter of the lateral side of the seat back, and
    the first pivotal connection of the hinge is disposed in the recessed section of the seat back, and the second pivotal connection of the hinge is disposed in the recessed section of the seat bottom.

3. The vehicle seating apparatus according to claim 1, wherein
    the first and second pivotal connections of the hinge are arranged such that the second pivotal connection of the hinge moves first causing the seat back to come forward, and then the first pivotal connection of the hinge moves causing the seat back to tilt downward to the non-seating configuration during a folding operation of the seat back from the seating configuration to the non-seating configuration.

4. The vehicle seating apparatus according to claim 1, wherein
    the buckle head is free from contact with the seat back during a folding operation of the seat back from the seating configuration to the non-seating configuration.

5. The vehicle seating apparatus according to claim 1, wherein
    the seat belt buckle bracket is biased in a rearward direction with respect to the seat bottom toward the seat back.

6. The vehicle seating apparatus according to claim 1, wherein
    the seat belt buckle bracket is biased by a spring.

7. The vehicle seating apparatus according to claim 1, wherein
    the seat belt buckle bracket is configured and arranged as a manually operated element that is moved from the stowed configuration to the usage configuration by an occupant while the seat back is in the seating configuration.

8. The vehicle seating apparatus according to claim 1, wherein
    the seat belt buckle assembly further includes an anchor plate coupled to the lateral side of the seat bottom, with the anchor plate restricting movement of the seat belt buckle bracket rearward of the stowed position.

9. The vehicle seating apparatus according to claim 8, wherein
    the anchor plate has a main body portion and a stop flange protruding from the main body portion to restrict movement of the seat belt buckle bracket rearward of the stowed position.

10. The vehicle seating apparatus according to claim 8, wherein
    the anchor plate is attached to the lateral side of the seat bottom by a fastener.

11. The vehicle seating apparatus according to claim 10, wherein
    the anchor plate includes a main body and a locating member that is spaced apart from the fastener and that protrudes from the main body into a locating aperture of the seat bottom.

12. The vehicle seating apparatus according to claim 8, wherein
the seat belt buckle assembly further includes a spring that has a first end that contacts the anchor plate and a second end that engages the seat belt buckle bracket.

13. The vehicle seating apparatus according to claim 8, wherein
the seat belt buckle assembly further includes a fastener which couples the seat belt buckle bracket and the anchor plate to the lateral side of the seat bottom.

14. The vehicle seating apparatus according to claim 1, wherein
the first end of the seat belt buckle bracket is pivotally mounted to the lateral side of the seat bottom by a fastener such that the seat belt buckle bracket and the buckle head are arranged to pivot about the fastener, and
the buckle head remains pivotally stationary relative to the fastener as the seat back moves from the seating configuration to the non-seating configuration.

15. A vehicle seating apparatus comprising:
a seat assembly including
a seat bottom, and
a seat back movably arranged with respect to the seat assembly between a seating configuration and a non-seating configuration in which the seat back is folded onto the seat bottom; and
a seat belt buckle assembly including
a seat belt buckle bracket having a first end movably coupled to a lateral side of the seat bottom,
a buckle head coupled to a second end of the buckle bracket that is distal with respect to the first end of the buckle bracket, with the buckle head being movably arranged with respect to the seat assembly between a usage position and a stowed position, and
an anchor plate coupled to the lateral side of the seat bottom, the anchor plate being attached to the lateral side of the seat bottom by a fastener, with the anchor plate restricting movement of the seat belt buckle bracket rearward of the stowed position,
the buckle head being arranged with respect to the seat assembly such that the seat back does not contact the buckle head while moving from the seating configuration to the non-seating configuration while the buckle head is in the stowed position, and
the anchor plate having a spring engagement aperture spaced apart from the fastener to engage a first end of a spring that biases the seat belt buckle bracket in a rearward direction with respect to the seat bottom toward the seat back.

16. The vehicle seating apparatus according to claim 15, wherein
the lateral side of the seat bottom has a recessed section, which is recessed with respect to an outer perimeter of the lateral side of the seat bottom, and which is disposed adjacent the seat back, with the seat belt buckle assembly being mounted within the recessed section of the seat bottom.

17. The vehicle seating apparatus according to claim 16, wherein
the lateral side of the seat bottom includes a forward section that is disposed forward of the recessed section of the seat bottom and that protrudes laterally beyond the recessed section of the seat bottom.

18. The vehicle seating apparatus according to claim 16, wherein
the seat back includes an upper section that protrudes laterally beyond the recessed section of the seat bottom to overhang above the recessed section of the seat bottom.

19. A vehicle seating apparatus comprising:
a seat assembly including
a seat bottom, and
a seat back movably arranged with respect to the seat assembly between a seating configuration and a non-seating configuration in which the seat back is folded onto the seat bottom; and
a seat belt buckle assembly including
a seat belt buckle bracket having a first end movably coupled to a lateral side of the seat bottom,
a buckle head coupled to a second end of the buckle bracket that is distal with respect to the first end of the buckle bracket, with the buckle head being movably arranged with respect to the seat assembly between a usage position and a stowed position,
an anchor plate coupled to the lateral side of the seat bottom, with the anchor plate restricting movement of the seat belt buckle bracket rearward of the stowed position, and
a spring that has a first end that contacts the anchor plate and a second end that engages the seat belt buckle bracket, the spring applying a biasing force to bias the seat belt buckle bracket in a rearward direction with respect to the seat bottom toward the seat back to the stowed configuration,
the buckle head being arranged with respect to the seat assembly such that the seat back does not contact the buckle head while moving from the seating configuration to the non-seating configuration while the buckle head is in the stowed position.

20. The vehicle seating apparatus according to claim 19, wherein
the seat back has a lateral side with a recessed section, which is recessed with respect to an outer perimeter of the lateral side of the seat back, and which is disposed adjacent the lateral side of the seat bottom having the seat belt buckle assembly, with the recessed section of the seat back including a mounting structure that pivotally attaches the seat back to the seat bottom.

21. The vehicle seating apparatus according to claim 20, wherein
the buckle head is disposed in the recessed section of the seat back with the seat back being in the non-seating configuration.

* * * * *